United States Patent
Toyama

[11] Patent Number: 5,226,403
[45] Date of Patent: Jul. 13, 1993

[54] METHOD OF USING AN ID SAW SLICING MACHINE FOR SLICING A SINGLE CRYSTAL INGOT AND AN APPARATUS FOR CARRYING OUT THE METHOD

[75] Inventor: Kohei Toyama, Fukushima, Japan

[73] Assignee: Shin-Etsu Handotai Co., Ltd., Tokyo, Japan

[21] Appl. No.: 700,603

[22] Filed: May 15, 1991

[30] Foreign Application Priority Data

May 18, 1990 [JP] Japan .................... 2-126609

[51] Int. Cl.⁵ .................... B28D 1/02; B28D 1/04
[52] U.S. Cl. .................... 125/13.01; 125/13.02
[58] Field of Search .................... 125/3, 4, 6, 7, 11, 125/11.47, 11.48, 11.17, 13.01, 13.02

[56] References Cited

U.S. PATENT DOCUMENTS

| | | | |
|---|---|---|---|
| 4,564,000 | 1/1986 | Stern et al. | 125/13.01 |
| 4,688,540 | 8/1987 | Ono | 125/13.01 |
| 4,700,596 | 10/1987 | Taguchi | 83/801 |
| 4,794,736 | 1/1989 | Fuwa et al. | 125/13.01 |
| 4,903,681 | 12/1990 | Honda et al. | 125/13.01 |
| 4,932,389 | 6/1990 | Saeki et al. | 125/13.01 |
| 4,949,700 | 8/1990 | Ebashi | 125/13.01 |
| 5,025,593 | 6/1991 | Kawaguchi et al. | 125/13.02 |

Primary Examiner—Frank T. Yost
Assistant Examiner—Paul M. Heyrana, Sr.
Attorney, Agent, or Firm—Whitham & Marhoefer

[57] ABSTRACT

An improved method of using an ID saw slicing machine for slicing a single crystal ingot in a direction normal to the axis of the ingot to obtain wafers. The feed of the single crystal ingot to the blade of the ID saw slicing machine is increased and decreased alternately in accordance with a predetermined control pattern.

7 Claims, 4 Drawing Sheets

METHOD OF USING AN ID SAW SLICING MACHINE FOR SLICING A SINGLE CRYSTAL INGOT AND AN APPARATUS FOR CARRYING OUT THE METHOD

The present invention relates to a method of using an ID saw slicing machine for slicing a single crystal ingot in a direction normal to the axis of the ingot to thereby obtain thin wafers, and also to a slicing apparatus for effecting the slicing operation of the method.

BACKGROUND OF THE INVENTION

An ID saw slicing machine is a slicing machine equipped with a thin doughnut-shaped blade with the inner edge coated with a hard material such as diamond powder. This machine is particularly useful in slicing a brittle rod such as a single crystal semiconductor ingot. As the blade of the ID saw slicing machine is rotated at a predetermined high speed, either the ingot or the slicing machine is slided in a manner such that the blade crosses the ingot in a direction normal to the axis of the ingot. The rate of this crossing of the blade is called "feed" or "feed rate" and measured in terms of a distance per unit time, e.g. "mm/min."

In the technical field of semiconductor manufacturing, a silicon single crystal ingot pulled up in a conventional single crystal pulling apparatus is sliced with an ID saw slicing machine (hereinafter also referred to as "an ID slicer") in a direction normal to the axis of the ingot, and a number of silicon semiconductor wafers are cut out. After a long use, the blade of the ID slicer wears and starts wobbling, and this causes the sliced wafer to show so-called face bow, which is a warp in one direction, or in other words, the residual stress in the wafer causes the wafers to curl slightly.

In order to solve this problem, some of the commercially available ID slicers are equipped with a displacement gauge which measures the wobble displacement of the blade of the slicer. The wobbling of the blade is detected by means of the displacement gauge, and based on the result of the detection, the blade is appropriately dressed and trued; also the slicing rate is modified in response to the result of the detection of the blade displacement in a feedback manner. Thus, efforts have been made in an attempt to obtain semiconductor wafers having as small a bow as possible.

PROBLEMS

However, in the conventional slicing method and apparatus, when the single crystal ingot to be sliced has a large diameter, as the current trend makes the situation more frequent, the inner diameter of the ID slicer has to be likewise increased, and the greater the inner diameter of the ID slicer, the poorer the accuracy of the detection of the blade displacement; as a result, the bow of the semiconductor wafers becomes greater.

Also, since the magnitude of the blade displacement is very small, it is by nature a difficult task to control and remove the bow of the semiconductor wafer. Therefore, a need continues to exist for an improved method and apparatus that can reduce even the infinitesimal bow from the wafers.

The present invention was made in view of these problems, and it is an object of the invention to provide a method of using an ID saw slicing machine for slicing a single crystal ingot into wafers in which the amount of bow is reduced, and also to provide a slicing apparatus for effecting this method.

SUMMARY OF THE INVENTION

In order to attain the above object and others the present inventors propose an improvement in a method of using an ID saw slicing machine having a blade which is rotated at a constant high speed for slicing a single crystal ingot in a direction normal to the axis of the ingot to obtain wafers, the improvement comprising that the feed of the single crystal ingot to the blade of the ID saw slicing machine is increased and decreased alternately in accordance with a predetermined control pattern.

In this connection the inventors also propose an apparatus for carrying out the above improved method which apparatus comprises an ID saw slicing machine for slicing a single crystal ingot in a direction normal to the axis of the ingot, a drive means for rotating the blade of the ID saw slicing machine at a constant speed, a shift means for shifting either the body consisting of the ID saw slicing machine and the drive means or the single crystal ingot in a manner such that the ingot is sliced in the direction normal to its axis, and a control means for controlling the shift means in a manner such that the feed of the single crystal ingot to the blade of the ID saw slicing machine is increased and decreased alternately in accordance with a predetermined control pattern stored in the control means.

According to the invention, the feed of the single crystal ingot to the blade of the ID slicer is controlled to increase and decrease alternately in accordance with the predetermined program, so that it is possible to intentionally give controlled irregularity to the surface of the wafer sliced from the single crystal ingot. This is because when the feed is high, the load resistance imposed by the single crystal ingot being sliced increases and causes the blade to wobble more roughly and thus the displacement of the blade is increased, and, on the other hand, when the feed is low, the load resistance decreases and causes the blade to wobble less roughly and thus the displacement of the blade is decreased; as a result, the wafer will easily have an irregular surface. The degrees (in magnitude and pitch) of the irregularity can be controlled by modifying the feed control pattern, for example the magnitude of the feed rate, the time pitch between the high rate feed and the low rate feed, and by controlling the operation carefully, the roughness of the irregularity can be restrained to a certain level. This intentionally formed irregularity prevents the wafer from warping and thus the resulting wafer will scarcely have a bow. The irregularity can be eventually removed by lapping and etching the wafer in the conventional manner. Consequently, it is possible to obtain a wafer with reduced warp or bow.

BRIEF DESCRIPTION OF THE DRAWINGS

The manner in which the foregoing and other objects of this invention are accomplished will be apparent from the accompanying specification and claims considered together with the drawings, wherein:

EMBODIMENT

Figure 1:
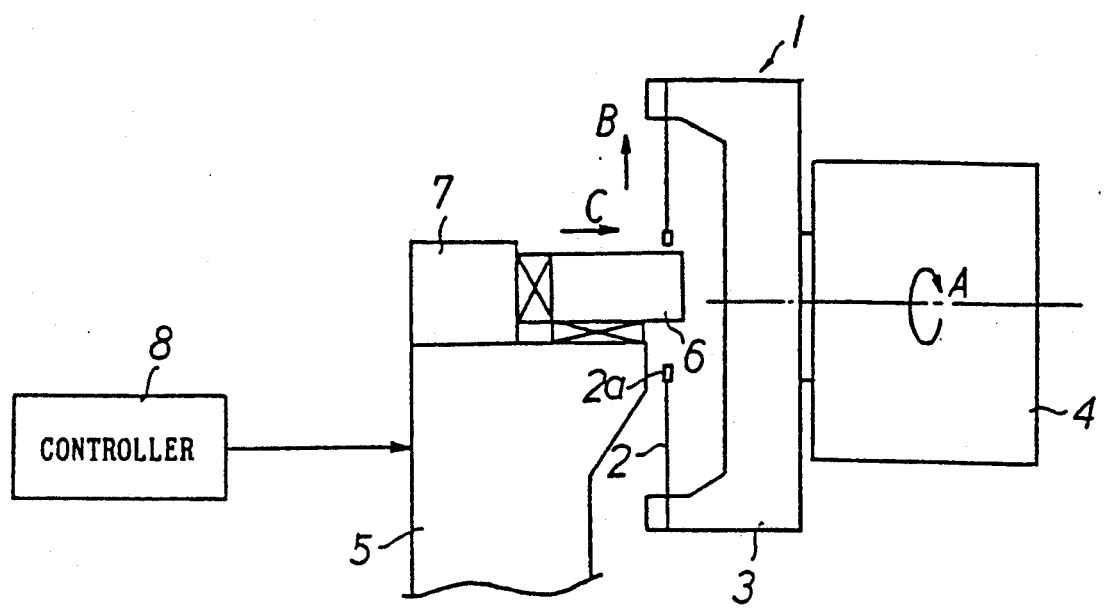
FIG. 1 is a schematic drawing showing the construction of the slicing apparatus of the invention.

Firstly, with reference to FIG. 1, the basic construction of a slicing apparatus of the invention will be explained. Reference numeral 1 designates an ID slicer which mainly consists of a thin ring blade 2, a drum-like main spindle head 3, and a motor 4. The outer edge of the blade 2 is embedded and fixed in the peripheral portion of the main spindle head 3; the blade 2 is held vertically and in coaxial alignment with the main spindle head 3, which is fixedly supported about the output shaft of the motor 4. The inner circumference of the blade 2 is formed with grinder edge 2a consisting of diamond powder.

In the vicinity of this ID slicer 1 is provided a feeder unit 5 which serves as an ingot mount as well. A cylindrical silicon single crystal ingot 6 to be sliced and an ingot slider unit 7 are mounted on the feeder unit 5. A controller 8 as the control means is electrically connected to the feeder unit 5.

Thus, as the motor 4 is started and its shaft is rotated as shown in FIG. 1, the ID slicer 1, directly connected to the shaft, is rotated in the same direction at a predetermined rate. Then, the ingot slider unit 7 pushes the single crystal silicon ingot 6 to slide in the direction indicated by the arrow C by a predetermined amount whereby the front end of the ingot 6 crosses across the hole defined by the inner circumference of the blade 2 of the ID slicer 1, as shown in FIG. 1.

Next, the feeder unit 5 is driven to shift the single crystal ingot 6 together with the ingot slider 7 in the direction indicated by the arrow B of FIG. 1 whereby the single crystal ingot 6 is cut by the grinder edge 2a of the blade 2 in the direction opposite to the arrow B which is normal to the axis of the ingot 6. The shifting of the ingot in direction B is continued until a thin disk-shaped silicon semiconductor wafer is completely severed from the ingot 6. Thereafter, the feeder unit 5 is driven in the direction opposite to direction B to shift back to the original position; at the same time the ingot slider unit 7 again urges the single crystal ingot 6 to shift in direction C by the predetermined amount so that the front end of the ingot 6 again enters the hole defined by the grinder edge 2a of the blade 2. The same procedure as described above is repeated to slice the wafers one after another off the ingot 6.

Now, if the feed rate of the ingot 6 in direction B determined by the shifting operation of the feeder unit 5 is constant throughout the slicing process, the wafers tend to curl slightly. However, in the present embodiment the shifting operation of the feeder unit 5 is controlled by the controller 8 in a manner such that the velocity of the feeder unit 5 in direction B, that is, the feed rate of the single crystal ingot 6 is varied in accordance with a predetermined program stored in the controller 8.

Figure 2:
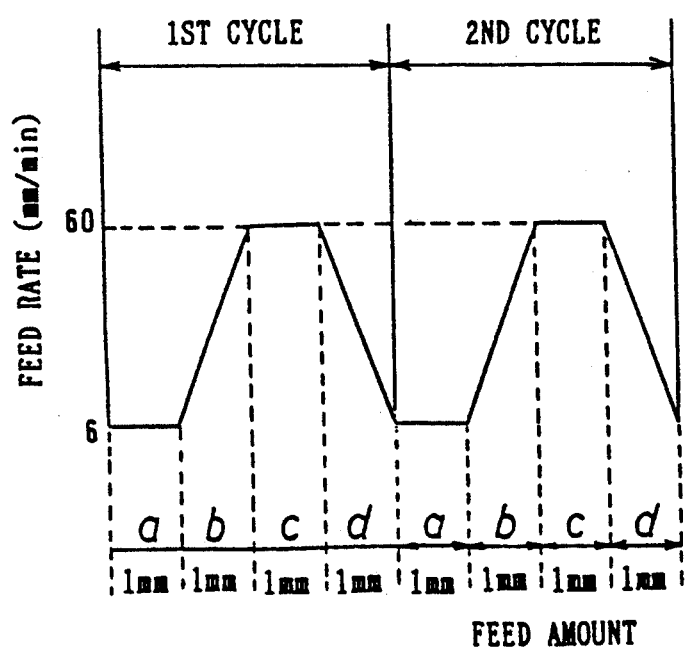
FIG. 2 is a graph showing an example of the control pattern of feed.

FIG. 2 shows an example of the program in which the feed rate is altered between a high rate and a low rate. The first 1-mm segment a is fed and cut at a lower feed rate of 6 mm/min.; during the cutting of the second 1-mm segment b the feed rate is gradually increased from 6 mm/min. to a higher feed rate of 60 mm/min.; during the cutting of the third 1-mm segment c the feed of the ingot 6 is maintained at the higher feed rate of 60 mm/min.; then during the cutting of the fourth 1-mm segment d the feed rate is gradually decreased to the lower rate of 6 mm/min. This feed rate cycle is repeated until a wafer is servered off.

Figure 3:
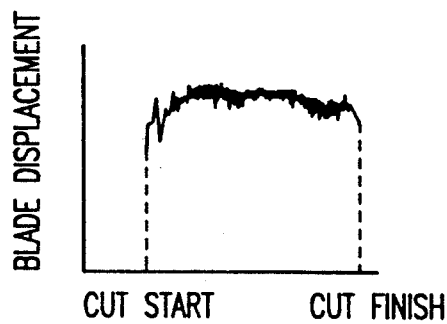
FIG. 3 is a graph showing the displacement of the slicer blade.

Generally, when the feed rate is high, the load resistance imposed by the single crystal ingot 6 being sliced on the blade 2 becomes greater, and thus the blade 2 wobbles more roughly to increase its displacement. On the other hand, when the feed rate is low, the load resistance becomes smaller, and thus the blade 2 wobbles less roughly to thereby decrease its displacement. Consequently, as in the present embodiment, when the feed is controlled to alternate between a high rate and a low rate, the displacement of the blade will increase and decrease between an upper value and a lower value, as observed in the graph of FIG. 3. As a result, the silicon semiconductor wafer W' thus severed from the ingot 6 has surfaces with controlled irregularity, as shown at (a) in FIG. 4. At the segments that are ground at the high feed rate, the irregularity is convexed and at the segments that are ground at the low feed rate, the irregularity is concaved; thus the wobbling blade 2 causes the semiconductor wafer W' to have irregular layers W1' and W2' at the surfaces.

Consequently, the alternating irregularity prevents the wafer from curling, and since the controlled irregularity is not as roughly made as it would be when uncontrolled, the roughness of the irregularity can be restricted to less than a certain degree. At the next step the both faces of the semiconductor wafer W' are lapped with loose abrasive grain. At the beginning of the lapping the convexed portions of the irregularity are first ground off by the lapping tool; then the concaved portions of the irregularity are smoothed as the lapping proceeds. Finally, the irregular layers W1' and W2' formed at the surfaces of the semiconductor wafer W' are entirely removed, and the faces of the thus lapped wafer W" are flattened leaving only the roughness of the rough layers W1" and W2" attributable to the scratches made by grinding of the loose abrasive grain.

Then, the semiconductor wafer W" is steeped in an etchant such as the mixed acid for a predetermined time period. This etching treatment removes the residual rough layers W1" and W2" from the faces of the semiconductor wafer W'". As the result, a semiconductor wafer W having no irregular or rough layers as well as having reduced bow is obtained. A number of thus obtained silicon semiconductor wafers having a diameter of 6 inch were measured for their bow (X) and found to have an average bow ($\overline{X}$) of 6 $\mu$m with a dispersion $\sigma$ of 2 $\mu$m. These values are half of those of the semiconductor wafers obtained through the conventional method. Thus the improvement brought about by the present invention is proved.

Figure 4A:
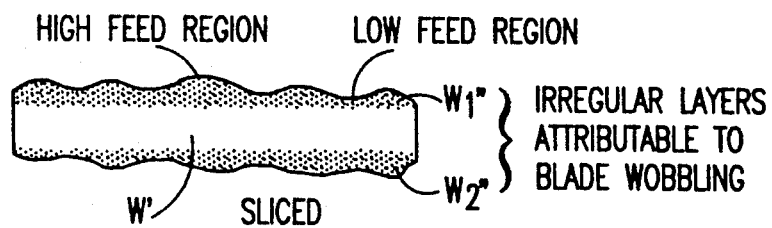
FIG. 4 is cross sectional views of a same wafer after slicing, lapping and etching, respectively.
Figure 4B:
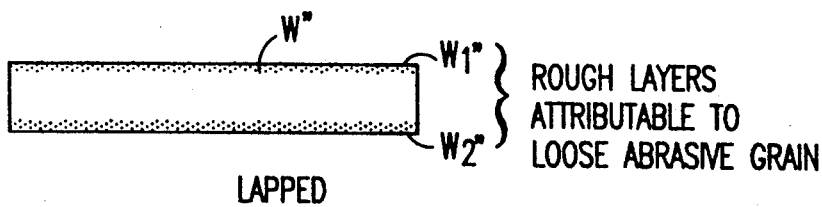
Figure 4C:
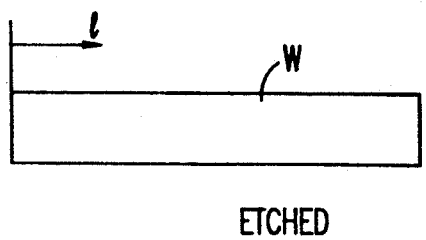
Figure 5:
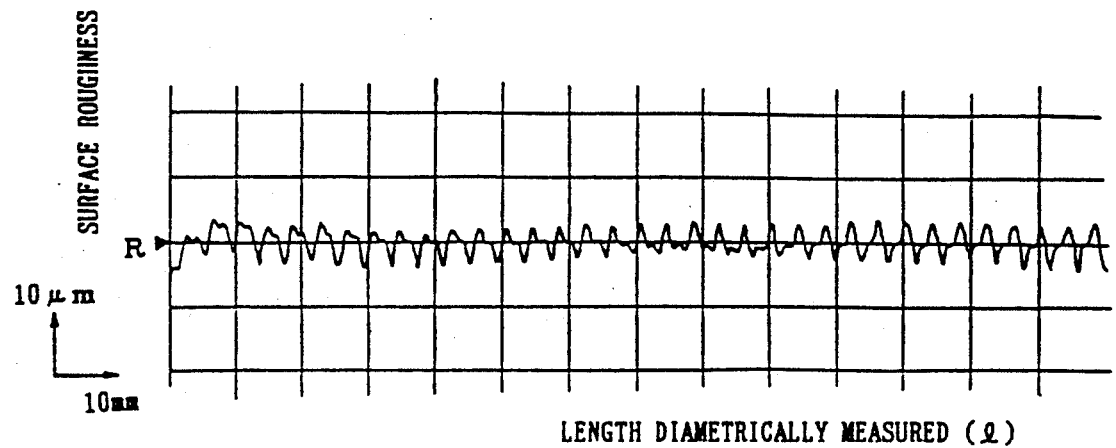
FIG. 5 is a graph showing the surface roughness of a finished wafer.
Figure 6:
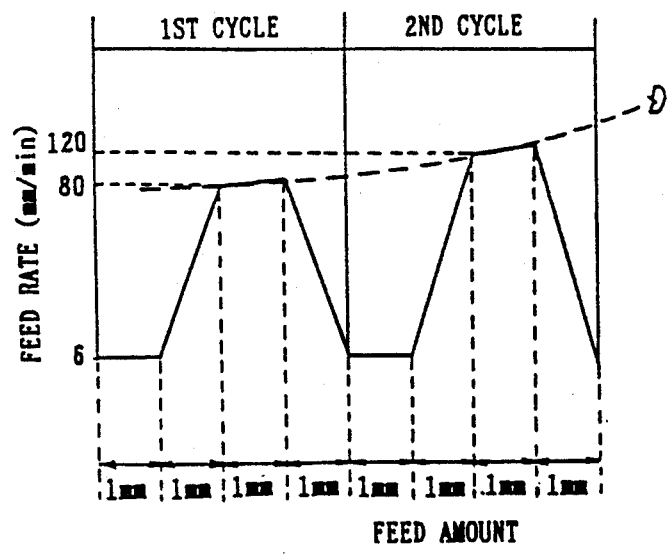
FIG. 6 is a graph showing another example of the control pattern of feed.

FIG. 5 shows the result of the measurement of the surface roughness of a 6-inch semiconductor wafer obtained through the procedure of the present embodiment. Incidentally, in FIG. 5, the axis of abscissa represents the length l of the semiconductor wafer along a certain diameter [ref. l in (c) of FIG. 4], the axis of ordinate represents the degree of the surface roughness, and R represents the average surface roughness. FIG. 6 shows a chart representing another example of the program for controlling the variation of the feed which is stored in the controller 8 (ref. FIG. 1). In this chart, a dashed-line curve D represents an empirically obtained graph which is characteristic in that if the feed is changed along this curve D while slicing a single crystal ingot the load resistance imposed by the ingot being sliced keeps constant. According to the chart of FIG. 6, in the first cycle, the first 1-mm segment of the ingot is fed at a lower feed rate of 6 mm/min.; during the cutting of the second 1-mm segment the feed rate is continuously increased from 6 mm/min. to a higher feed rate of 80 mm/min. which is obtained by intersecting the vertical line representing x=2 mm with the curve D; during the cutting of the third 1-mm segment the feed rate is increased along the curve D; then during the cutting of the fourth 1-mm segment the feed rate is continuously decreased to the lower rate of 6 mm/min; then in the next cycle, the feed rate is maintained at 6 mm/min. throughout the first segment; in the next segment the rate is continuously increased to 120 mm/min., which is obtained by intersecting the vertical line representing x=6 mm with the curve D; in the third segment the feed rate is increased along the curve D; then in the fourth segment the feed rate is continuously decreased to 6 mm/min. The similar cycle is repeated until a wafer is cut off.

Figure 7:
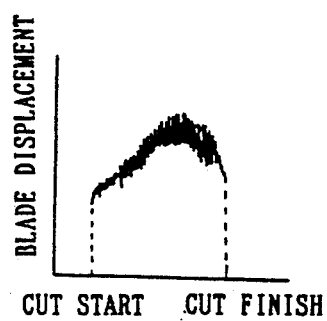
FIG. 7 is a graph showing the displacement of the slicer blade.
Figure 8:
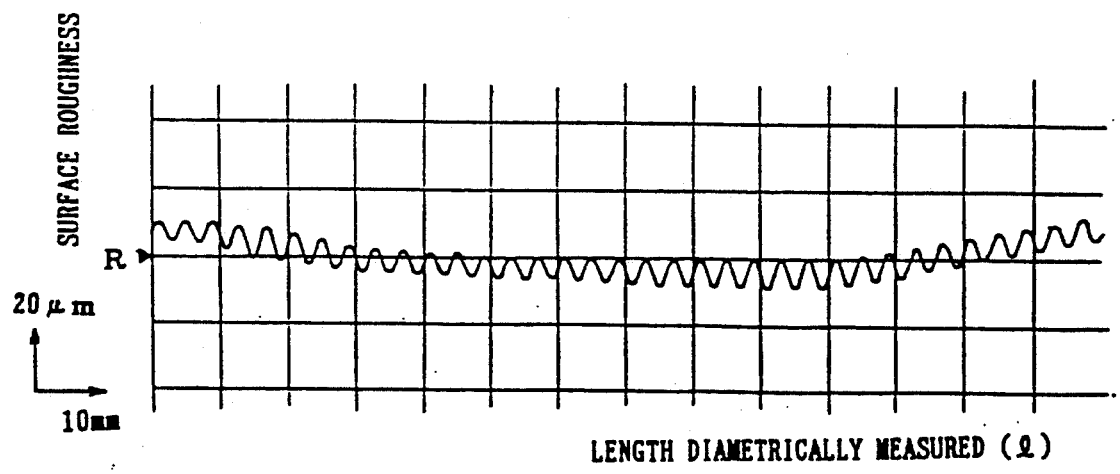
FIG. 8 is a graph showing the surface roughness of a wafer.

The wafer obtained in this example also has surfaces with controlled irregularity, similar to the one shown at (a) in FIG. 4, and the bow of the wafer is less than the that of a conventionally obtained wafer. Incidentally, FIG. 7 shows the displacement of the blade 2 and FIG. 8 shows the surface roughness of the wafer obtained in the present example.

In the examples described above, the slicing of the wafer was effected as the single crystal ingot 6 is moved while the ID saw slicer 1 is kept stationary, it is also possible to effect the slicing by moving the ID saw slicer 1 while the single crystal ingot 6 is kept stationary. In the latter case, the shifting velocity of the body consisting of the ID saw slicer 1 and the motor 4 is controlled by the controller 8.

EFFECTS OF THE INVENTION

As described above, according to the invention, the feed of the single crystal ingot to the blade of the ID saw slicing machine is increased and decreased alternately in accordance with a predetermined control pattern, so that it is possible to intentionally give slight irregularity to the faces of the wafer sliced from the single crystal ingot; as a result, the wafer will have less bow even after removing the irregularity through conventional lapping and etching processes.

While there have been described preferred forms of the invention, obviously modifications and variations are possible in light of the above teachings. It is therefore to be understood that within the scope of the appended claims, the invention may be practiced otherwise than as specifically described.

What is claimed is:

1. An improved method of using an ID saw slicing machine having a blade which is rotated at a constant high speed and means for feeding a single crystal ingot to the blade of the ID saw slicing machine in a direction normal to the axis of the ingot for slicing a single crystal ingot in a direction normal to the axis of the ingot to obtain wafers, wherein the rate of feeding of the single crystal ingot to the blade of the ID saw slicing machine is increased and decreased alternately in accordance with a predetermined control pattern and wherein said control pattern of said feeding step comprises the steps of
   a) maintaining said rate of said relative motion at a predetermined low rate during cutting of a first segment of said ingot,
   b) continuously increasing said rate of relative motion to a predetermined high rate during cutting of a second segment of said ingot,
   c) maintaining said rate of said relative motion at a predetermined high rate during cutting of a third segment of said ingot, and
   d) continuously reducing said rate of relative motion to said predetermined low rate during cutting of a fourth segment of said ingot.

2. A method as claimed in claim 1 wherein said predetermined control pattern is such that: the feed is maintained at a predetermined low rate while a first segment of the ingot is cut; the feed is continuously increased to a predetermined high rate while a second segment of the ingot is cut; the feed is maintained at the predetermined high rate while a third segment of the ingot is cut; and the feed is continuously decreased to the predetermined low rate while a fourth segment of the ingot is cut; then this procedure is repeated until a wafer is cut off.

3. A method as claimed in claim 1 wherein said predetermined control pattern is such that the feed is alternated between a predetermined low rate and a variable high rate determined from a characteristic curve which is characteristic in that if the feed is changed along this curve while slicing a single crystal ingot the load resistance imposed by the ingot keeps constant.

4. A method as recited in claim 1 including the further step of repeating steps a)-d).

5. An apparatus for slicing a single crystal ingot comprising an ID saw slicing machine for slicing a single crystal ingot in a direction normal to the axis of the ingot, a drive means for rotating the blade of the ID saw slicing machine at a constant high speed, a shift means for shifting either the body consisting of the ID saw slicing machine and the drive means or the single crystal ingot in a manner such that the ingot is sliced in the direction normal to its axis, and a control means for controlling the shift means in a manner such that the feed of the single crystal ingot to the blade of the ID saw slicing machine is gradually increased and gradually decreased alternately in accordance with a predetermined control pattern stored in the control means.

6. A method of using an ID saw slicing machine having a blade which is rotated at a constant high speed for slicing a single crystal ingot in a direction normal to an axis of said ingot to obtain wafers, said method including the step of
   feeding said single crystal to said blade of said ID saw slicing machine by providing relative motion to said single crystal ingot and said blade wherein a rate of said relative motion is alternately gradually increased and gradually decreased in accordance with a predetermined control pattern.

7. A method as recited in claim 6, wherein said feeding step includes alternately increasing and decreasing said rate of relative motion between a high rate and a low rate including the further step of establishing at least one of said high rate and said low rate in accordance with an empirically determined characteristic corresponding to a constant load resistance imposed by said ingot on said blade of said ID saw.

* * * * *